(12) United States Patent
Kwatra et al.

(10) Patent No.: US 11,676,593 B2
(45) Date of Patent: Jun. 13, 2023

(54) TRAINING AN ARTIFICIAL INTELLIGENCE OF A VOICE RESPONSE SYSTEM BASED ON NON_VERBAL FEEDBACK

(71) Applicant: INTERNATIONAL BUSINESS MACHINES CORPORATION, Armonk, NY (US)

(72) Inventors: Shikhar Kwatra, San Jose, CA (US); Paul N. Krystek, Highland, NY (US); Sushain Pandit, Austin, TX (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 17/107,992

(22) Filed: Dec. 1, 2020

(65) Prior Publication Data
US 2022/0172714 A1    Jun. 2, 2022

(51) Int. Cl.
*G10L 15/22* (2006.01)
*G10L 15/16* (2006.01)
*G10L 15/06* (2013.01)

(52) U.S. Cl.
CPC ............ *G10L 15/22* (2013.01); *G10L 15/063* (2013.01); *G10L 15/16* (2013.01); *G10L 2015/0638* (2013.01); *G10L 2015/227* (2013.01)

(58) Field of Classification Search
CPC ....... G10L 15/22; G10L 15/063; G10L 15/16; G10L 2015/0638; G10L 2015/227
See application file for complete search history.

(56) References Cited

U.S. PATENT DOCUMENTS 5,855,000 A * 12/1998 Waibel ................. G06V 10/98
704/E15.04
8,185,392 B1 * 5/2012 Strope ..................... G10L 15/01
704/251

(Continued)

FOREIGN PATENT DOCUMENTS

CN        101647033 A      2/2010
CN        111353033   *    2/2020

(Continued)

OTHER PUBLICATIONS

Kim, K. et al. "Does a Digital Assistant Need a Body? The Influence of Visual Embodiment and Social Behavior on the Perception of Intelligent Virtual Agents in AR"; In 2018 IEEE International Symposium on Mixed and Augmented Reality (ISMAR); IEEE, Oct. 2018; pp. 105-114.

(Continued)

*Primary Examiner* — Jialong He
(74) *Attorney, Agent, or Firm* — Cantor Colburn LLP; Erik Johnson

(57) ABSTRACT

Methods, systems, and computer program products for training an artificial intelligence (AI) of a voice response system. Aspects include receiving, by the voice response system from a user, a voice command to perform a requested action and interpreting, by an AI model, the voice command. Aspects also include performing an action based on the interpretation of the voice command and receiving non-verbal feedback from the user. Aspects further include updating the AI model based on a determination that the non-verbal feedback indicates that the user is not satisfied with the action performed.

14 Claims, 6 Drawing Sheets

(56) References Cited

U.S. PATENT DOCUMENTS

| | | | |
|---|---|---|---|
| 8,661,029 B1* | 2/2014 | Kim | G06F 16/24578 |
| | | | 707/723 |
| 9,375,845 B1* | 6/2016 | Annan | B25J 11/0005 |
| 9,454,962 B2 | 9/2016 | Tur et al. | |
| 9,633,674 B2 | 4/2017 | Sinha | |
| 10,460,342 B1* | 10/2019 | Jacobs, II | G06Q 30/0251 |
| 2008/0021884 A1* | 1/2008 | Jones | G06F 16/951 |
| 2008/0091628 A1 | 4/2008 | Srinivasa et al. | |
| 2010/0161652 A1 | 6/2010 | Bellare et al. | |
| 2011/0307241 A1* | 12/2011 | Waibel | G10L 15/26 |
| | | | 704/2 |
| 2014/0214426 A1* | 7/2014 | Kanevsky | G10L 21/02 |
| | | | 704/251 |
| 2016/0365088 A1 | 12/2016 | Liang et al. | |
| 2017/0263147 A1* | 9/2017 | King | G11B 27/026 |
| 2018/0214075 A1* | 8/2018 | Falevsky | G16H 50/30 |
| 2019/0005021 A1* | 1/2019 | Miller | G06Q 10/06 |
| 2019/0340527 A1* | 11/2019 | Liden | G06N 3/082 |
| 2019/0348038 A1 | 11/2019 | Hori et al. | |
| 2019/0355351 A1* | 11/2019 | Kim | B60W 50/087 |
| 2020/0027459 A1 | 1/2020 | Chae et al. | |
| 2020/0143808 A1 | 5/2020 | Hwang et al. | |
| 2020/0294489 A1* | 9/2020 | Ding | G10L 25/63 |
| 2021/0158138 A1* | 5/2021 | Hazra | G06F 3/017 |
| 2022/0093094 A1* | 3/2022 | Krishnan | G06V 40/20 |

FOREIGN PATENT DOCUMENTS

| | | | |
|---|---|---|---|
| CN | 111081248 A | | 4/2020 |
| EP | 1494129 A1 | | 1/2005 |
| WO | WO-2020119030 | * | 6/2020 |

OTHER PUBLICATIONS

Mell, Peter et al. "The NIST Definition of Cloud Computing—Recommendations of the National Institute of Standards and Technology", Special Publication 800-145, U.S Dept of Commerce; Sep. 2011, 7 pgs.

* cited by examiner

TRAINING AN ARTIFICIAL INTELLIGENCE OF A VOICE RESPONSE SYSTEM BASED ON NON_VERBAL FEEDBACK

BACKGROUND

The invention relates generally to operating a voice response system and, more specifically, to training artificial intelligence (AI) of a voice response system based on user behavior.

Voice response systems are becoming very popular. Typically, voice response systems monitor ambient audio for voice commands from users. The voice commands direct the voice response systems to execute specific actions and to provide auditory responses to the user. In some cases, the actions taken by the voice response system and the responses provided to the user can be inaccurate based on the user's intended context because the AI used by the voice response system misunderstood the words that made up the voice command.

SUMMARY

According to another embodiment, a method for training artificial intelligence (AI) of a voice response system is provided. The method includes receiving, by the voice response system from a user, a voice command to perform a requested action and interpreting, by an AI model, the voice command. The method also includes performing an action based on the interpretation of the voice command and receiving non-verbal feedback from the user. The method further includes updating the AI model based on a determination that the non-verbal feedback indicates that the user is not satisfied with the action performed.

According to an embodiment, a system for training artificial intelligence (AI) of a voice response system is provided. The system includes a memory having computer-readable computer instructions, and a processor for executing the computer-readable instructions. The computer-readable instructions include instructions for receiving, by the voice response system from a user, a voice command to perform a requested action and interpreting, by an AI model, the voice command. The computer-readable instructions also include performing an action based on the interpretation of the voice command and receiving non-verbal feedback from the user. The computer-readable instructions further include updating the AI model based on a determination that the non-verbal feedback indicates that the user is not satisfied with the action performed.

According to a further embodiment, a computer program product is provided. The computer program product includes a computer-readable storage medium having program instructions embodied therewith. The program instructions are executable by a computer processor to cause the computer processor to perform a method. The method includes receiving, by the voice response system from a user, a voice command to perform a requested action and interpreting, by an AI model, the voice command. The method also includes performing an action based on the interpretation of the voice command and receiving non-verbal feedback from the user. The method further includes updating the AI model based on a determination that the non-verbal feedback indicates that the user is not satisfied with the action performed.

Additional features and advantages are realized through the techniques of the invention. Other embodiments and aspects of the invention are described in detail herein are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings, in which:

DETAILED DESCRIPTION

Figure 1:
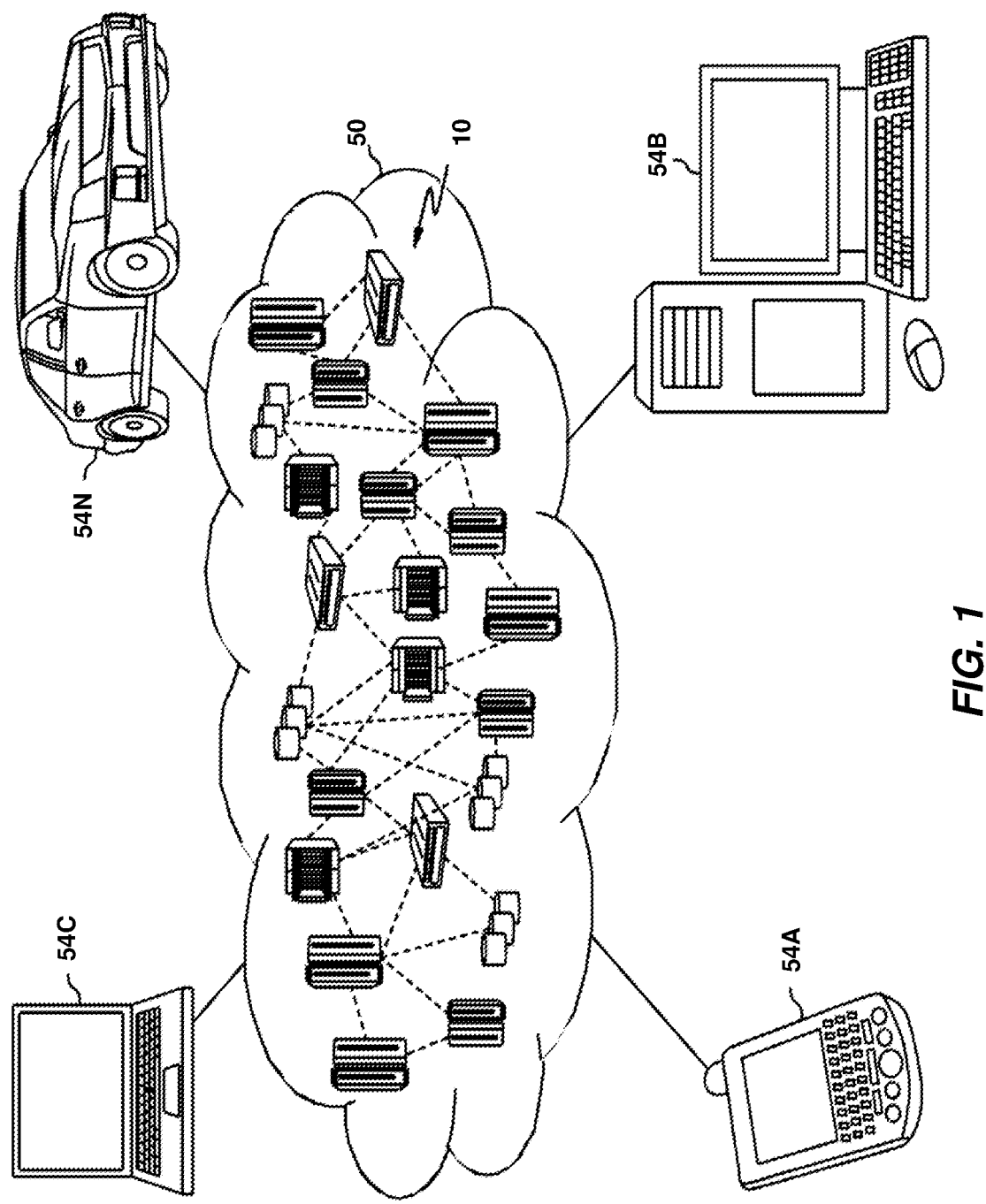
FIG. 1 depicts a cloud computing environment according to one or more embodiments of the present invention.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist, on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist, on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
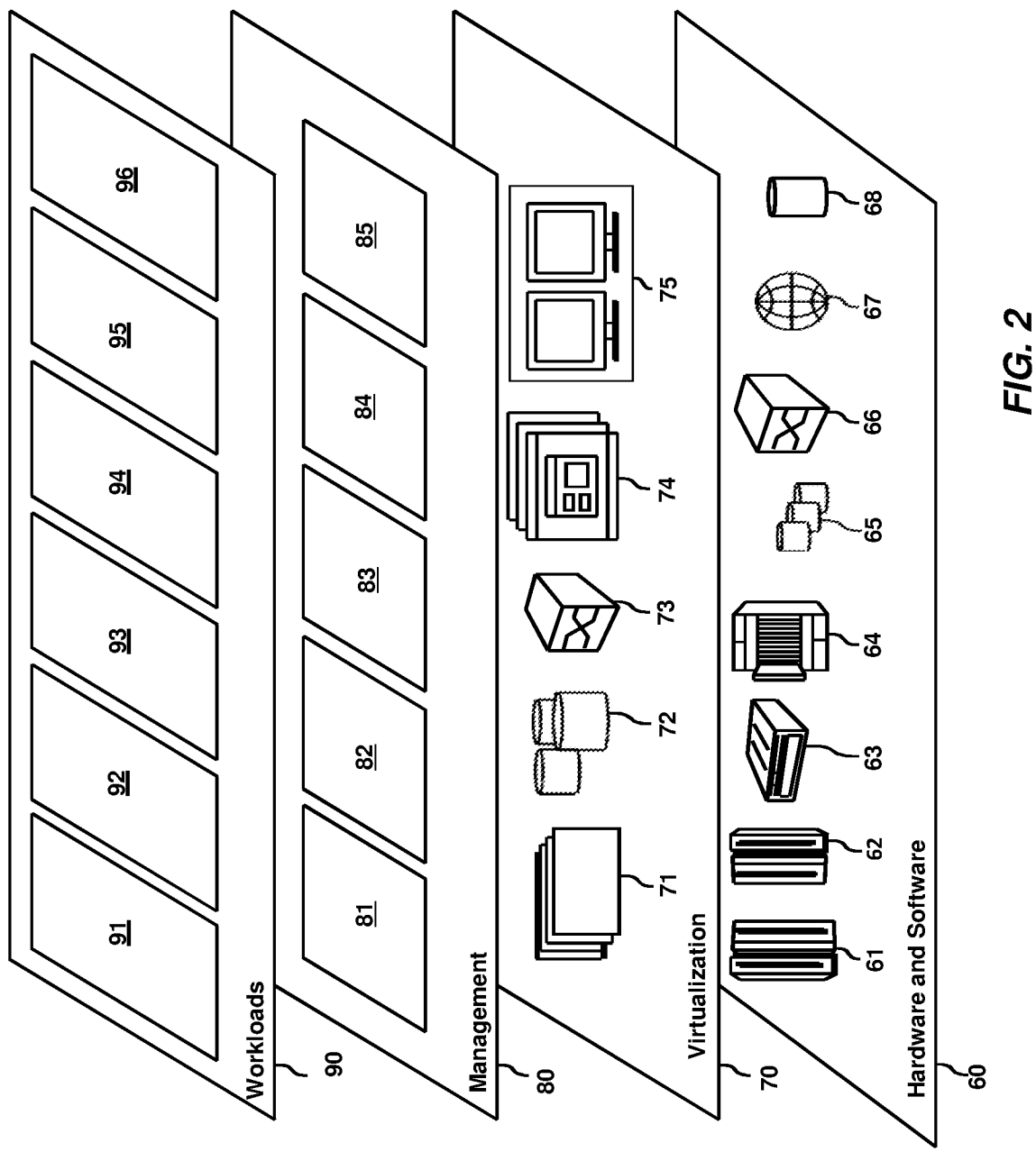
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and training an artificial intelligence (AI) of a voice response system 96.

Figure 3:
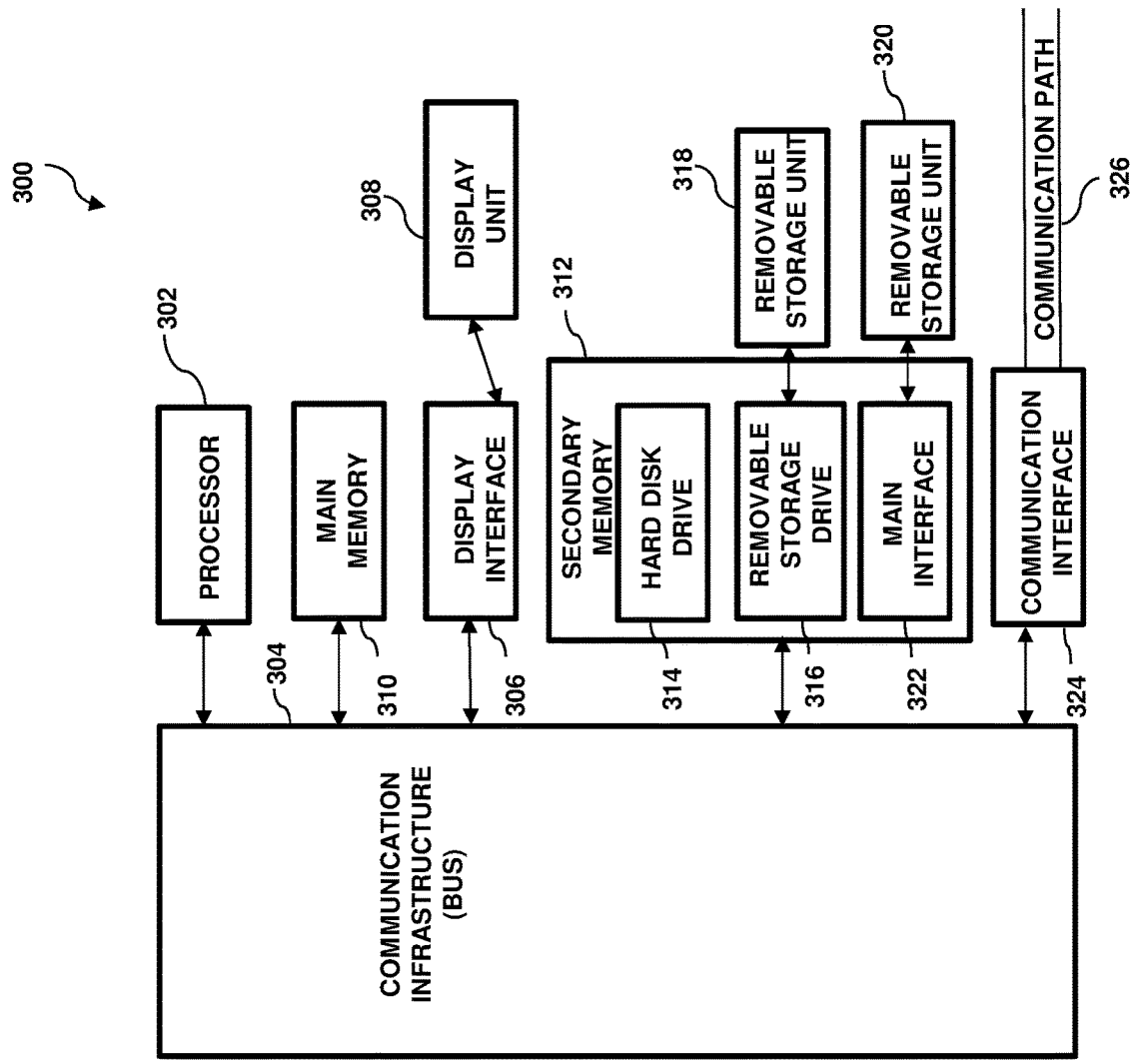
FIG. 3 depicts an exemplary computer system capable of implementing one or more embodiments of the present invention.

Turning now to a more detailed description of aspects of the present invention, FIG. 3 illustrates a high-level block diagram showing an example of a computer-based system 300 useful for implementing one or more embodiments of the invention. Although one exemplary computer system 300 is shown, computer system 300 includes a communication path 326, which connects computer system 300 to additional systems and may include one or more wide area networks (WANs) and/or local area networks (LANs) such as the internet, intranet(s), and/or wireless communication network(s). Computer system 300 and additional systems are in communication via communication path 326, (e.g., to communicate data between them).

Computer system 300 includes one or more processors, such as processor 302. Processor 302 is connected to a communication infrastructure 304 (e.g., a communications bus, cross-over bar, or network). Computer system 300 can include a display interface 306 that forwards graphics, text, and other data from communication infrastructure 304 (or from a frame buffer not shown) for display on a display unit 308. Computer system 300 also includes a main memory 310, preferably random access memory (RAM), and may also include a secondary memory 312. Secondary memory 312 may include, for example, a hard disk drive 314 and/or a removable storage drive 316, representing, for example, a floppy disk drive, a magnetic tape drive, or an optical disk drive. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disk, etc. which is read by and written to by a removable storage drive 316. As will be appreciated, removable storage unit 318 includes a computer readable medium having stored therein computer software and/or data.

In some alternative embodiments of the invention, secondary memory 312 may include other similar means for allowing computer programs or other instructions to be loaded into the computer system. Such means may include, for example, a removable storage unit 320 and an interface 322. Examples of such means may include a program package and package interface (such as that found in video game devices), a removable memory chip (such as an EPROM or PROM) and associated socket, and other removable storage units 320 and interfaces 322 which allow software and data to be transferred from the removable storage unit 320 to computer system 300.

Computer system 300 may also include a communications interface 324. Communications interface 324 allows software and data to be transferred between the computer system and external devices. Examples of communications interface 324 may include a modem, a network interface (such as an Ethernet card), a communications port, or a PCM-CIA slot and card, etc. Software and data transferred via communications interface 324 are in the form of signals which may be, for example, electronic, electromagnetic, optical, or other signals capable of being received by communications interface 324. These signals are provided to communications interface 324 via communication path (i.e., channel) 326. Communication path 326 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 310 and secondary memory 312, removable storage drive 316, and a hard disk installed in hard disk drive 314. Computer programs (also called computer control logic) are stored in main memory 310, and/or secondary memory 312. Computer programs may also be received via communications interface 324. Such computer programs, when run, enable the computer system to perform the features of the present disclosure as discussed herein. In particular, the computer programs, when run, enable processor 302 to perform the features of the computer system. Accordingly, such computer programs represent controllers of the computer system.

In exemplary embodiments, a system for training an artificial intelligence (AI) of a voice response system is provided. In exemplary embodiments, a voice response system is configured to monitor ambient audio for a voice command from a user. The voice response system uses an AI to interpret the voice command, and based on the interpretation, the voice response system provides a response to the user and/or performs an action requested by the user. The voice response system is also configured to monitors the reaction of the user to the response provide or action taken by the voice response system. The reaction can be monitored using microphones and/or cameras in communication with the voice response system. The voice response system analyzes the reaction of the user and determines whether the user is satisfied with the response provided or the action taken. If the user is not satisfied with the response provided or the action taken, the voice response system updates the AI model used to interpret the voice commands.

Figure 4:
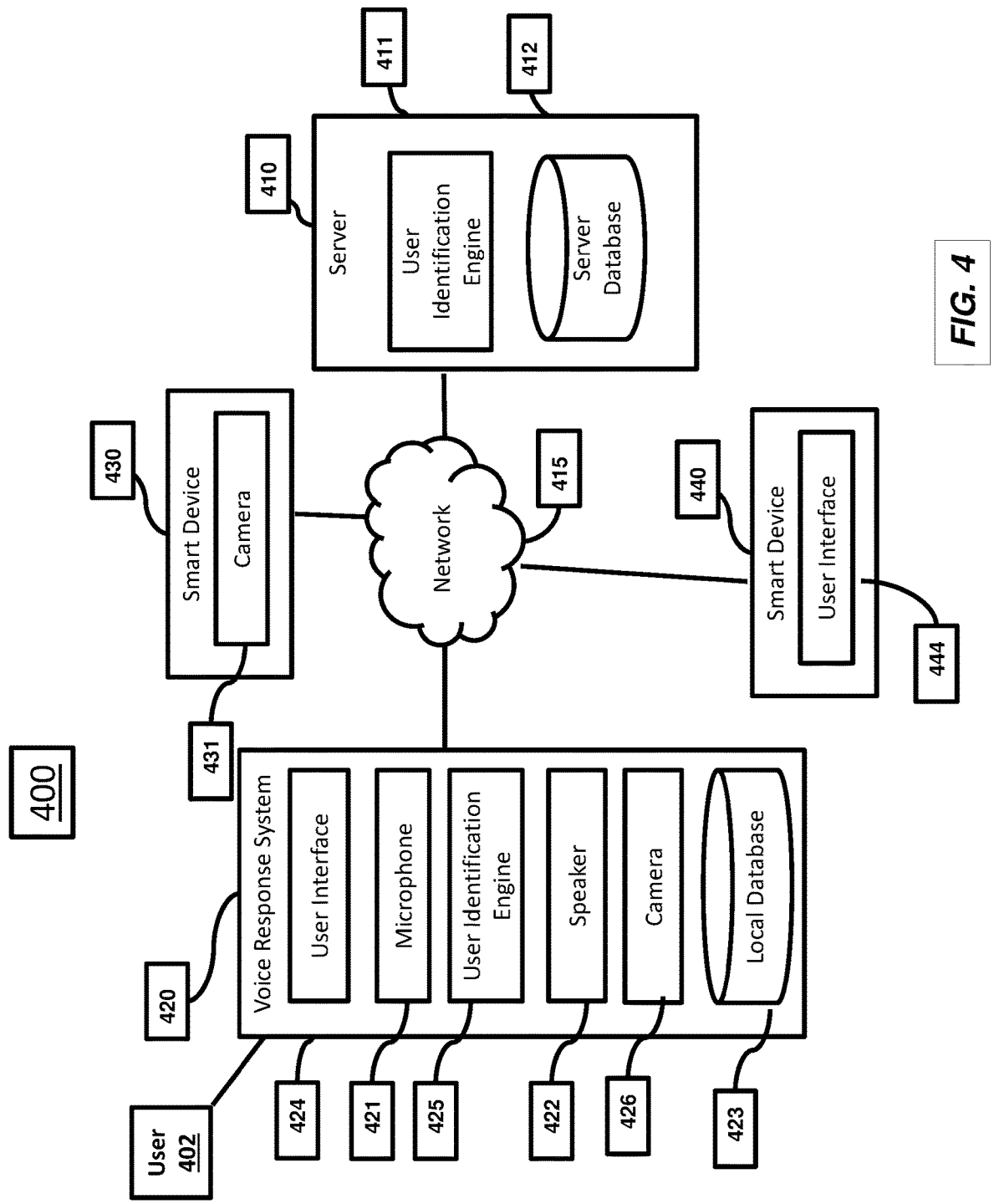
FIG. 4 depicts a system including a voice response system according to one or more embodiments of the present invention.

Turning now to FIG. 4, a system 400 upon which training artificial intelligence (AI) of a voice response system may be implemented will now be described in accordance with an embodiment. The system 400 shown in FIG. 4 includes a server 410 in communication with a voice response system 420 via a communications network 415. The communications network 415 may be one or more of, or a combination of, public (e.g., Internet), private (e.g., local area network, wide area network, virtual private network), and may include wireless and wireline transmission systems (e.g., satellite, cellular network, terrestrial networks, etc.). The voice response system 420 is configured to receive voice commands from one or more users 402 in the range of the voice response system 420.

In exemplary embodiments, the voice response system 420 can be a smartphone, a tablet, a computer system such as the one shown in FIG. 3, a smart speaker, a television, or any other suitable electronic device. The voice response system 420 includes a microphone 421 and a speaker 422. Optionally, the voice response system 420 can also include a local database 423, a user interface 424, a user identification engine 425, and a camera 426. The microphone 421 is used to detect voice commands for the voice response system 420 and the speaker 422 is used to provide responses to the voice commands. In exemplary embodiments, the local database 423 is configured to store user profiles that include voice samples and/or images of authorized users of the voice response system 420. The user identification engine 425 can include a voice recognition engine that is configured to compare received voice commands to stored voice samples in the local database 423. Likewise, the user identification engine 425 can include a facial recognition engine that is configured to compare images, which are captured by the camera 426, of users to stored images in the local database 423. The user interface 424 can be a graphical user interface such as a touchscreen, a keyboard, or the like that can be used to create a user profile. The user profile stores known information regarding the user including a user's language preference, data on words/expressions that the user had trouble understanding, and data regarding user preferences for the type of additional reference information to be provided to the user.

In various embodiments, the user profiles including voice samples and/or images of authorized users of the voice response system 420 can be stored in the local database 423 and/or the server database 412. Likewise, the identification of a user can be performed by the user identification engine 425 of the voice response system 420 or by the user identification engine 411 of the server 410. The server 410 can be implemented as a computer system such as the one shown in FIG. 3 or as a cloud-based system such as the one shown in FIGS. 1 & 2. In embodiments where the server 410 is configured to perform user identification and to store audio files and images of the authorized users, the voice response system 420 is configured to capture audio files and/or images of the users and to transmit them to the server 410.

In exemplary embodiments, the voice response system 420 is in communication with one or more smart devices 430, 440 via network 415. Smart device 430 includes a camera 431 that is configured to capture images of the user 402 and to transmit the images to the voice response system 420 so that the voice response system 420 can identify the user 402. In exemplary embodiments, the smart device 430 may be controllable by the voice response system 420. Smart device 440 includes a user interface 444 that is configured to receive textual input from a user. The user interface 44 can be a graphical user interface such as a touchscreen, a keyboard, or the like that can be used to provide textual input. The smart devices 430, 440 may be a smartphone, a tablet, a computer system such as the one shown in FIG. 3, a smart speaker, a television, or any other suitable electronic device.

Figure 5:
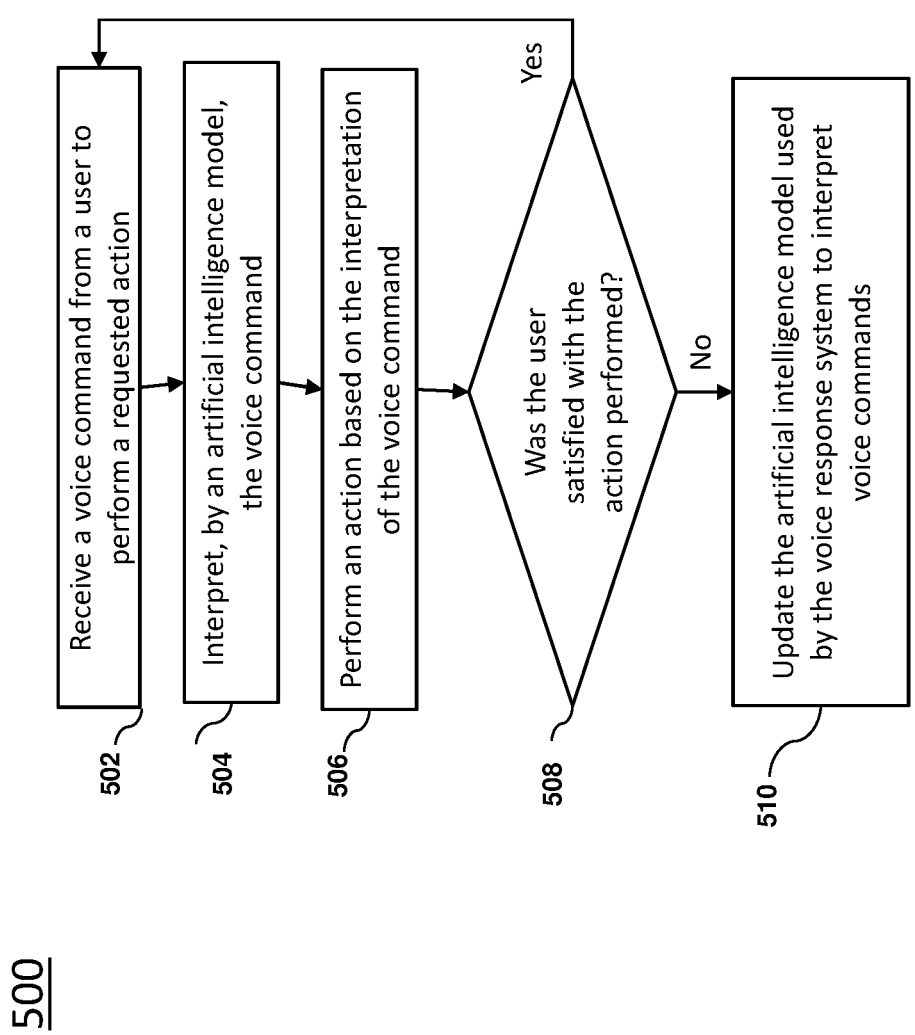
FIG. 5 depicts a flow diagram of a method for training artificial intelligence (AI) of a voice response system according to one or more embodiments of the present invention.

Turning now to FIG. 5, a flow diagram of a method 500 for training an artificial intelligence (AI) of a voice response system in accordance with an embodiment is shown. The method 500 begins at block 502 by receiving a voice command from a user to perform a requested action. Next, as shown at block 504, the method includes interpreting, by an AI, the voice command. Next, as shown at block 506, the method 500 includes performing an action based on the interpretation of the voice command. As shown at decision block 508, the method 500 includes determining whether the user is satisfied with the action performed. The determination of whether the user is satisfied with the action performed is made by monitoring and analyzing the reaction of the user to the action performed. In one embodiment, the reaction of the user includes a physical reaction to the user, such as a change in facial expression, statements made by the user, or the user laughing. In another embodiment, the reaction of the user includes actions taken by the user in a threshold period of time after the action is performed. Such actions can include, but are not limited to, providing subsequent requests to the voice response system, providing text input to another smart device, and the user performing an action. If it is determined that the user is satisfied the response action performed, the method 500 returns to block 502. Otherwise, the method 500 proceeds to block 510 and updates the artificial intelligence model used by the voice response system to interpret voice commands, as shown at block 508.

In exemplary embodiments, the voice response system is configured to track a change in the user's behavior or one or more users of a group change in behavior after the response to the voice-based command is provided. The voice response system, from its learning of user reactions, will determine there is a problem with its understanding of the provided the voice command based on a change in the user's behavior. In one embodiment, the change in behavior can be, starts laughing, repeating the same voice command, and the like. In one embodiment, based on the change in behavior analysis of the surrounding user(s), the voice response system determines that the voice command was not properly understood. In one embodiment, once it is determined that the voice command was not properly understood, the voice response is configured to ask for user feedback by audio or video means (e.g. displaying the feedback question). For example, if users are started laughing, then the AI system might ask, "Am I very wrong!"

In exemplary embodiments, the voice response system is configured to track if the user is performing multiple attempts to achieve the same goal within a time-period. Based on determining that the user performed multiple attempts to achieve the same goal, the voice response system will determine that the voice commands for at least some of the attempts were interpreted in an incorrect manner. In one embodiment, the voice response system will select a different AI model for interpreting subsequent voice commands when multiple voice commands are serially received that attempt to achieve the same goal within a time-period. In addition, the voice response system may be configured to automatically remove previously provided results from the results of subsequent response. For example, based on detecting multiple attempts for the same voice command, voice response system is configured to start eliminating each wrong interpretation and will produce new voice to text and will observe the change in behavior among the surrounded users. In another embodiment, based on detecting multiple failed attempts within a time-period, then the voice response system will prompt the user to provide written text from the user to better gain confidence in what the user is asking of the system. The written text can be provided using any smart device that is in communication with the voice response system.

In some embodiments, the user may not perform multiple attempts at the voice command itself, however, after issuing a voice command once, the user may navigate straight to the search bar and start typing, using any smart device that is in communication with the voice response system. This is often the case when the initial voice interpretation is so far away from what the user intended that the user sees more value is just tying a search query instead. In such a scenario, the voice response system will compare the typed search query to the last interpreted voice command result. Based on the comparison of the typed search query to the last interpreted voice command result, the voice response system is configured to update the AI model that was used to interpret the last voice command. Updating the AI model can include establishing a general semantic relationship between the voice command and the desired interpretations or adjusting its internal learning model to better classify the voice query for future attempts.

In some embodiments, the voice response system is configured to gather biometric data from the wearable devices of the user or user group with a range of the voice response system. The biometric data is used to determine whether the voice response system has understood the voice command in a different manner, accordingly it will correct the same during next attempt. For example, the biometric data can indicate that a user is getting irritated based on detecting an increase in heart rate or blood pressure. In some cases, the voice response system may realize that feedback is very specific to the user's interpretation rather than being generally applicable. This determination can be made by monitoring feedback across a large set of users, with varying characteristics (age, geography, etc). In such scenarios, the voice response system creates separate AI models for specific user profiles (by geography, age, etc.) and maintains those for specific user profiles while still maintaining the original models for general responses.

Figure 6:
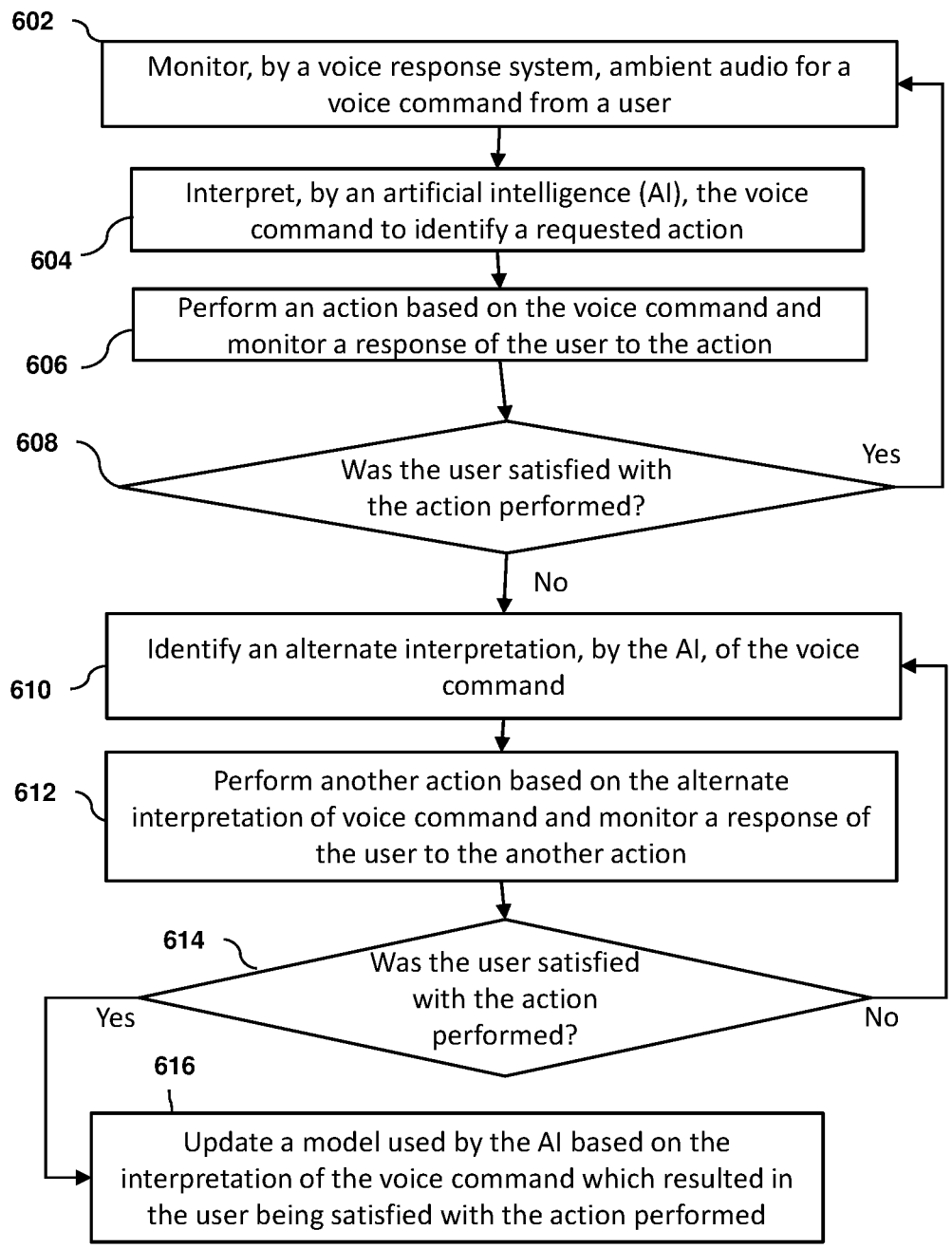
FIG. 6 depicts a flow diagram of another method for training an AI of a voice response system according to one or more embodiments of the present invention.

Turning now to FIG. 6, a flow diagram of a method 600 for training an artificial intelligence (AI) of a voice response system in accordance with an embodiment is shown. As shown at block 602, the method 600 includes monitoring, by the voice response system, ambient audio for a voice command from a user. Next, as shown at block 604, the method 600 includes interpreting, by an artificial intelligence, the voice command to identify a requested action. The method 600 also includes performing an action based on the voice command and monitoring a response of the user to the action, as shown at block 606. Next, as shown at decision block 608, it is determined whether the user is satisfied with the action performed. The determination of whether the user is satisfied with the action performed is made by monitoring and analyzing the reaction of the user to the action performed. In one embodiment, the reaction of the user includes a physical reaction to the user, such as a change in facial expression, statements made by the user, or the user laughing. In another embodiment, the reaction of the user includes actions taken by the user in a threshold period of time after the action is performed. Such actions can include, but are not limited to, providing subsequent requests to the voice response system, providing text input to another smart device, and the user performing an action. If it is determined that the user is satisfied with the action performed, the method 600 returns to block 602. Otherwise, the method 600 proceeds to block 610.

Continuing with reference to FIG. 6, as shown at block 610, the method 600 includes identifying an alternate interpretation, by the AI, of the voice command. Next, as shown at block 612, the method 600 includes performing another action based on the alternate interpretation of the voice command and monitor a response of the user to the another action. As shown at decision block 614, the method includes determining if the user is satisfied with the another action that was performed. The determination of whether the user is satisfied with the another action performed is made by monitoring and analyzing the reaction of the user to the another action performed. If it is determined that the user is satisfied the another action that was performed, the method 600 proceeds to block 616 and updates a model used by the AI based on the interpretation of the voice command which resulted in the user being satisfied with the action performed. Otherwise, the method 600 returns to block 610.

In one example, the voice response system is built into a television and a user is able to use the voice response system to control the operation of the television. For example, a user can instruct the voice response system to tune the television to a desired channel or to search for a desired show. In some cases, the television voice response system will interpret the voice command in an incorrect manner and not perform the desired action. In these cases, the user might repeat the same voice command or surrounded people will and or the user may laugh at the voice to text conversion. In exemplary embodiments, the voice response system is configured to observe change in the user's behavior, or user groups behavior, and will infer that the voice to text conversion is not correct. In some cases, the television is configured to display the text conversion of the voice command on the screen and also allow the user to use a connected device, such as a smartphone, to provide textual input to correct the text conversion. In one embodiment, the voice-based system will use textual input received after an incorrect voice to text conversion to train the AI model used to perform the voice to text conversion. In some embodiments, the voice response system is configured to ask a user for feedback if the user's reaction to the action performed is not apparent.

In one embodiment, an algorithm is used to monitor the behavior of the user to determine whether a user is satisfied with actions taken by the voice response system in response to received voice commands. For each user (Ui) in the current detected list of users (U) obtain user characteristics, such as: tone (t); personality (p); language expression (l); facial gestures (f); and body gesture/action (b), which can be represented as Ui(t, p, l, g, b). The user characteristics (Ui (t, p, l, g, b)) are analyzed to determine a cognitive state (cs) and behavior (Be) of the user, which is represented as Ui(cs, be). Based on a determination that Ui(cs, be) exceeds an initial threshold time (tw), a monitoring session is started for Ui and cohorts. For each history record Ui_Hi in Ui_H, If Ui_Hi contains an old user cognitive state behavior and activity/spoken command Ui(cs, be) that triggered a feedback to the system that is similar to the current Ui(cs, be), then a cluster monitoring session is started for Ui and cohorts. The Ui and cohorts are continuously monitored by the voice response system. After the voice response system performs an action based on a received voice command, the user characteristics Ui are measured to detect a change in the behavior of the user. In one embodiment, clustering actions (P_Ai) are performed based on the observed user characteristics. Each clustering action contains a set of machine comprehensible actions, a duration, a prioritization, and a set of user cognitive states and behaviors Ux(cs, be) for which the P_Ai is recommended. The prioritization in the P_Ai is used to set the order of clustering action in which these minimize affectation to user usage. A P_Ai is selected according to the current Ui(cs, be) and priority P_Ai_p. After P_Ai execution duration, the voice response system continues to monitor the behavior of the user. Based on a determination that Ui(cs, be) is below the warning threshold for a configured amount of time, the monitoring session is finished.

In exemplary embodiments, the reaction of the user to the response and/or the actions performed are monitored by one or more cameras in communication with the voice response system and/or by a microphone of the voice response system. In one embodiment, the reaction of the user to the response and/or the actions performed is monitored by a microphone of the voice response system and the determination that the user is not satisfied with the response provide, or action taken, is based on facial expression and/or a statement made by the user after the response is played or the action is performed.

Technical benefits include an improved functionality of voice response systems that are able to detect that the AI of the voice response system mis-understood and/or mis-interpreted the voice command of the user. By detecting and correcting the confusion of the AI, the usability of the voice response system is improved. In addition, the AI model used by the artificial intelligence systems that are used to operate the voice response systems can be updated and selected based on detected items that cause confusion to improve the overall functionality of the voice response systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for training an artificial intelligence (AI) of a voice response system, the method comprising:
    receiving, by a microphone of the voice response system directly from a user, a voice command to perform a requested action;
    interpreting, by an AI model, the voice command;
    performing an action based on the interpretation of the voice command;
    receiving a non-verbal feedback from the user during a threshold time after the action is performed, wherein the non-verbal feedback includes a physical reaction of the user; and
    updating the AI model based on a determination that the non-verbal feedback indicates that the user is not satisfied with the action performed,
    wherein determination that the non-verbal feedback indicates that the user is not satisfied with the action performed is based on the physical reaction of the user including a change in biometric data gathered from a wearable device of the user.

2. The method of claim 1, wherein the non-verbal feedback is provided by the user in response to a request from the voice response system for the user to type the voice command.

3. The method of claim 1, further comprising monitoring a behavior of the user within the threshold time after the action is performed.

4. The method of claim 1, further comprising creating a correlation among a determined change in behavior of the user within a threshold time after the action is performed and the interpreted voice command to identify a portion of the voice command that is being wrongly interpreted.

5. The method of claim 4, further comprising comparing the portion of the voice command that is being wrongly interpreted to data from other users to identify a best AI model for the user.

6. A system for training an artificial intelligence (AI) of a voice response system, the system comprising:
    a memory having computer-readable instructions; and
    a processor for executing the computer-readable instructions, the computer-readable instructions including instructions for:
        receiving, by a microphone of the voice response system directly from a user, a voice command to perform a requested action;
        interpreting, by an AI model, the voice command;
        performing an action based on the interpretation of the voice command;
        receiving a non-verbal feedback from the user during a threshold time after the action is performed, wherein the non-verbal feedback includes a physical reaction of the user; and
        updating the AI model based on a determination that the non-verbal feedback indicates that the user is not satisfied with the action performed,
    wherein determination that the non-verbal feedback indicates that the user is not satisfied with the action performed is based on the physical reaction of the user including a change in biometric data gathered from a wearable device of the user.

7. The system of claim 6, wherein the non-verbal feedback is provided by the user in response to a request from the voice response system for the user to type the voice command.

8. The system of claim 6, wherein the computer-readable instructions further include instructions for comprising monitoring a behavior of the user within the threshold time after the action is performed.

9. The system of claim 6, wherein the computer-readable instructions further include instructions for creating a correlation among a determined change in behavior of the user within a threshold time after the action is performed and the interpreted voice command to identify a portion of the voice command that is being wrongly interpreted.

10. The system of claim 9, wherein the computer-readable instructions further include instructions for comparing the portion of the voice command that is being wrongly interpreted to data from other users to identify a best AI model for the user.

11. A computer program product comprising a computer-readable storage medium having program instructions embodied therewith the program instructions executable by a computer processor to cause the computer processor to perform a method, comprising:

receiving, by a microphone of a voice response system directly from a user, a voice command to perform a requested action;

interpreting, by an AI model, the voice command;

performing an action based on the interpretation of the voice command;

receiving a non-verbal feedback from the user during a threshold time after the action is performed, wherein the non-verbal feedback includes a physical reaction of the user; and updating the AI model based on a determination that the non-verbal feedback indicates that the user is not satisfied with the action performed, wherein determination that the non-verbal feedback indicates that the user is not satisfied with the action performed is based on the physical reaction of the user including a change in biometric data gathered from a wearable device of the user.

12. The computer program product of claim 11, wherein the non-verbal feedback is provided by the user in response to a request for the user to type the voice command.

13. The computer program product of claim 11, wherein the method further comprises monitoring a behavior of the user within the threshold time after the action is performed.

14. The computer program product of claim 11, wherein the method further comprises creating a correlation among a determined change in behavior of the user within a threshold time after the action is performed and the interpreted voice command to identify a portion of the voice command that is being wrongly interpreted.

\* \* \* \* \*